United States Patent Office 2,824,077
Patented Feb. 18, 1958

2,824,077

PROCESS FOR POLYMERIZING A PROLAMINE AND AN ACRYLIC ACID, THE PRODUCT OBTAINED THEREBY, AND A PHOTOGRAPHIC EMULSION CONTAINING SAME

William J. Priest, Rochester, N. Y., assignor to Eastman Kodak Company, Rochester, N. Y., a corporation of New Jersey No Drawing. Application March 26, 1953
Serial No. 344,890

8 Claims. (Cl. 260—8)

This invention pertains to new compositions of matter formed by the interaction of acrylic acid with prolamines such as zein, and to methods for manufacture of such compositions.

The invention employs as a base material a particular type of protein known as the prolamines. The prolamines are aqueous alcohol-soluble proteins. When prepared by alcoholic extractions and by driving off the solvent, the residual prolamine is a hard horny mass. In general the prolamines are characterized by insolubility in water, in absolute alcohol and in other neutral solvents, but are soluble in relatively strong aqueous alcohols of, for example, 70% to 80% alcohol. The common prolamines are obtained from seeds of the cereal grains, and are designated zein from corn, gliadin from wheat, and hordein from barley. This general source and classification of prolamines is not exclusive, for it is known that there are other so-called prolamines, such as an alcohol-soluble protein found in milk, which however has chemical characteristics somewhat different from those of the proteins from cereals. In referring herein to prolamines it is to be understood that prolamines from cereals and such other alcohol-soluble proteins as have similar behavior, are specifically intended.

The prolamines usually occur in grains in the gluten, and are extractable therefrom by an aqueous alcohol solvent. For example, corn gluten may be extracted with a solvent mixture of 75% ethyl alcohol and 25% water, to remove the prolamine "zein."

Prolamines have heretofore been employed as base materials for coatings, films and filaments. However, many of these coatings are unstable when subjected to chemical solutions, particularly those found in photographic processing.

An object of this invention is to provide a modified prolamine which is quite soluble in aqueous systems under alkaline conditions. Another object of this invention is to provide a gelatin extender suitable for use in photographic products, particularly emulsions, baryta binders, snubbing compositions and sizing coats.

This invention provides a method for obtaining modified proteins of the prolamine type which are soluble in alkaline aqueous solution without excessive degradation of the protein molecule. This is accomplished by polymerizing a substance of the vinyl type which, when polymerized alone, leads to the production of a water-soluble polymer, in a solution containing the protein whose modification is desired. The product of this kind of process is more hydrophilic than is the original protein, and the properties may be altered by suitable variation of the conditions of reaction as hereinafter described.

More specifically I have found that prolamines such as zein may be modified by adding the prolamine to monomeric acrylic acid and polymerizing to form a product which is completely soluble in dilute ammonia. Other vinyl compositions which may be used to modify prolamines include such compositions as methacrylic acid, itaconic acid and the like. This product presumably has more carboxyl groups than the unmodified prolamine, thus showing more hydrophilic properties and greater ease of solution in mild aqueous alkali.

The following examples are give to illustrate the invention:

EXAMPLE 1

A solution of zein was made up according to the following formula:

| | Parts |
|---|---|
| Zein | 50 |
| Ethanol | 200 |
| Water | 25 |

To 55 parts of the above were added 10 parts of monomeric acrylic acid and 1 part of 30 percent hydrogen peroxide. This was heated in a sealed bottle on a steam bath for 1 hour. The resultant polymer was found to be completely soluble in dilute ammonia and nearly entirely soluble in a dilute solution of sodium bicarbonate. A coating of the ammonia solution dried to a clear hard film.

EXAMPLE 2

A solution of zein was made up according to the following formula:

| | Parts |
|---|---|
| Zein | 50 |
| Ethanol | 200 |
| Water | 25 |

To 50 parts of this were added 1 part of 30 percent hydrogen peroxide and 2.0 parts monomeric acrylic acid. This composition was heated for 1 hour on a steam bath in a closed bottle. The resultant polymer was found to be soluble in dilute aqueous ammonia. When the ammonia solution was evaporated on a glass plate, a clear brittle film resulted. When the aqueous ammonia solution of this product was heated, much polymer separated but redissolved on recooling. A control in which 50 parts of the zein solution was heated in a steam bath for 1 hour with 1 part of hydrogen peroxide and 2 parts glacial acetic acid was found to be insoluble in aqueous ammonia.

In order to obtain a measure of the degradation of the protein used in preparations similar to those of the above Example 2, viscosity measurements were made on solutions prior to and following the reaction. Table I shows the results of these measurements.

Table I

| Sample | Relative Viscosity |
|---|---|
| 18.2% (wt.) zein solution in ethanol-water | 27.7 |
| Product of Example 2–21% (wt.) solid | 25.0 |
| 14.3% (wt.) zein solution in ethanol-water-acetic acid | 18.7 |
| 14.3% (wt.) zein solution heated for 1 hour in 0.5% $K_2S_2O_8$ and 14% acetic acid | 15.1 |

These data demonstrate that no substantial degradation of the zein under the conditions of the reaction takes place. When larger amounts of polymerizable acid are employed (as in Example 1), the viscosity of the product is considerably higher due to the tendency for the acid to polymerize to products of high molecular weight.

While these examples illustrate zein products, similar results can be obtained from other prolamines such as gliadin, hordein, and the like, and it has not been considered necessary to repeat herein examples as above using each such prolamine. The modifier may consist of any polymerizable vinyl type monomer capable of interacting with protein which is soluble in the reaction medium chosen.

The change in solubility of the zein, modified in accordance with the procedure outlined herein, is thought to be connected with accretion by the zein polymer of carboxyl groups from the added acid. This very likely occurs by a chain transfer process in which a group or groups on the zein act as chain transfer agents. By reactions of this character, chains of poly acid branch off the main polypeptide structure.

Polymeric products available by this invention may be used as gelatin addenda for photographic use, and these modified prolamines have been found to be compatible with gelatin. In addition to such uses, these materials may be used as water-soluble glues, emulsion stabilizers or pigment binders. The compositions obtained closely resemble certain proteins from animal sources and may be useful as substitutes.

I claim:

1. The process for forming a gelatin substitute for photographic applications comprising polymerizing a prolamine selected from the class consisting of zein, gliadin, and hordein in the presence of a per compound polymerizing catalyst with a vinyl compound selected from the class consisting of acrylic acid, methacrylic acid, and itaconic acid.

2. A process for the production of a gelatin substitute for photographic applications comprising polymerizing a prolamine selected from the class consisting of zein, gliadin and hordein in an ethanol water solution containing a per compound polymerization catalyst, with a vinyl compound selected from the class consisting of acrylic acid, methacrylic acid, and itaconic acid.

3. A process for forming a gelatin substitute for photographic applications comprising polymerizing a prolamine selected from the class consisting of zein, gliadin and hordein in the presence of a per compound polymerization catalyst with a polymerizable vinyl compound selected from the class consisting of acrylic acid, metacrylic acid and itaconic acid by heating a mixture of the prolamine and the vinyl compound to a temperature of about 100° C.

4. A gelatin substitute for photographic applications comprising a prolamine selected from the class consisting of zein, gliadin and hordein polymerized with a vinyl compound selected from the class consisting of acrylic acid, methacrylic acid and itaconic acid in the presence of a per compound polymerization catalyst.

5. A gelatin substitute for photographic applications comprising zein polymerized with acrylic acid in the presence of a per compound polymerization catalyst.

6. A gelatin substitute for photographic applications comprising zein polymerized in the presence of a per compound polymerization catalyst with from 15 to 50% of acrylic acid.

7. A photographic emulsion containing zein polymerized in the presence of a per compound polymerization catalyst with acrylic acid and light-sensitive silver halide salts.

8. The process comprising polymerizing zein in the presence of hydrogen peroxide with a compound selected from the class consisting of acrylic acid and methacrylic acid.

References Cited in the file of this patent

UNITED STATES PATENTS

| | | |
|---|---|---|
| 1,981,102 | Hagedorn et al. | Nov. 20, 1934 |
| 2,354,210 | Jacobson | July 25, 1944 |
| 2,406,958 | McQueen | Sept. 3, 1946 |
| 2,460,976 | Church | Feb. 8, 1949 |
| 2,498,792 | Cottet et al. | Feb. 28, 1950 |
| 2,548,520 | Damschroder et al. | Apr. 10, 1951 |
| 2,579,871 | Schoene | Dec. 25, 1951 |